UNITED STATES PATENT OFFICE.

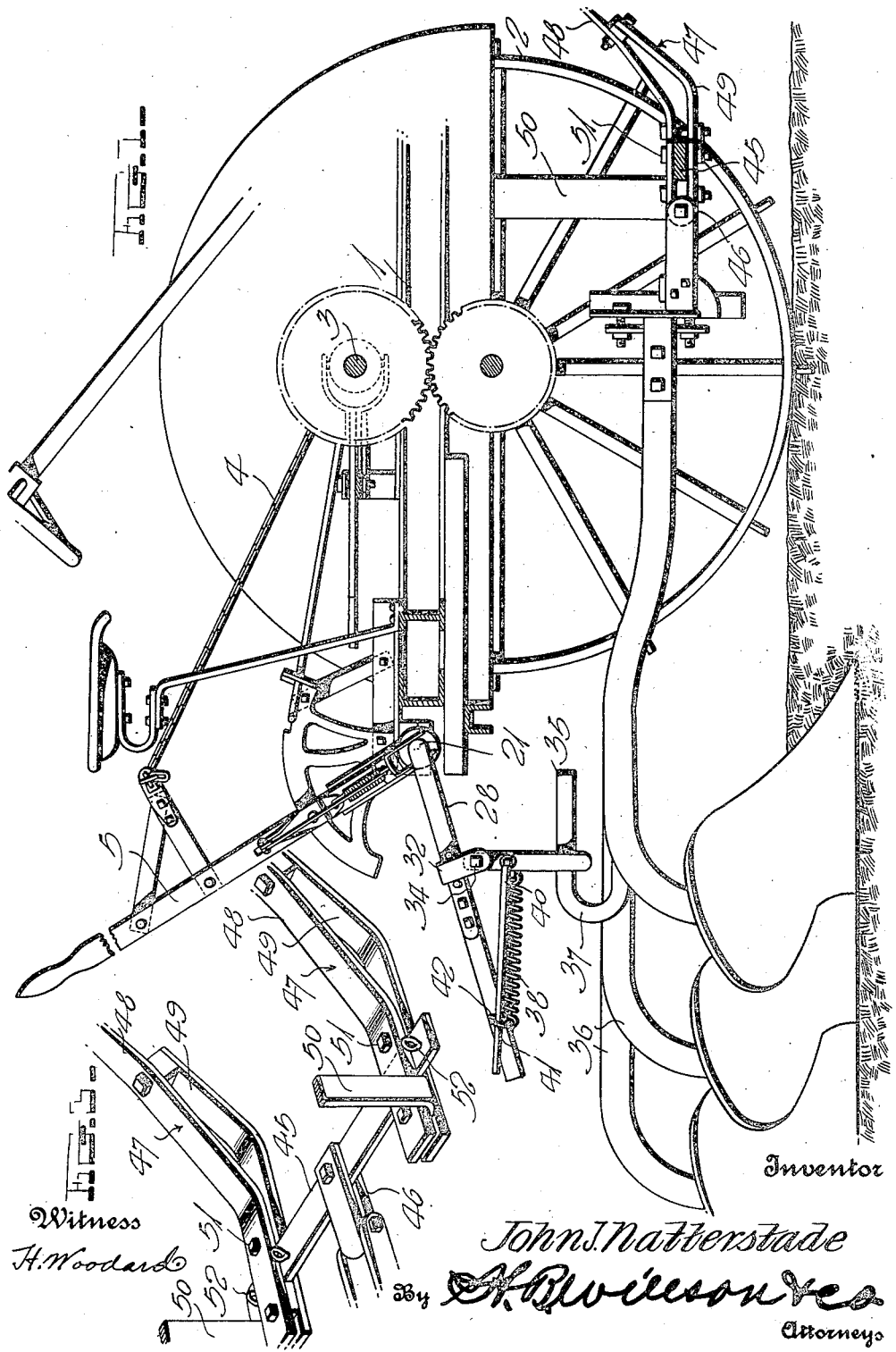

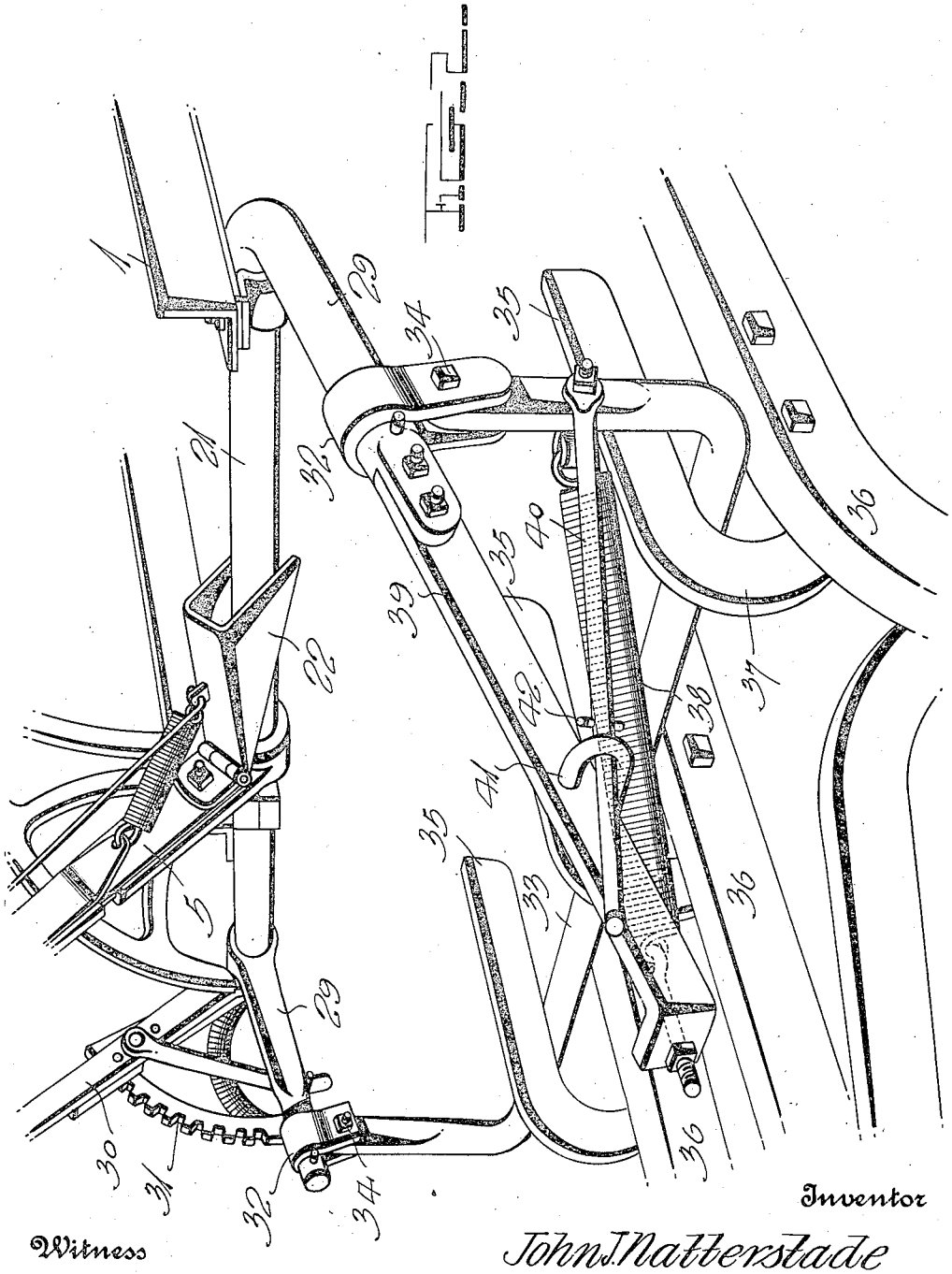

JOHN J. NATTERSTADE, OF SIOUX CITY, IOWA.

HITCHING AND COUPLING MEANS FOR TRACTOR-PLOWS.

1,369,980.  Specification of Letters Patent.  Patented Mar. 1, 1921.

Application filed May 10, 1920. Serial No. 380,364.

*To all whom it may concern:*

Be it known that I, JOHN J. NATTERSTADE, a citizen of the United States, residing at Sioux City, in the county of Woodbury and State of Iowa, have invented certain new and useful Improvements in Hitching and Coupling Means for Tractor-Plows; and I do declare the following to be a full, clear, and exact description of the invention, such as will enable others skilled in the art to which it appertains to make and use the same.

My invention relates to improvements in agricultural machines and more particularly to those in which plows or other implements are attached to and drawn by a tractor.

The principal object of my invention is to provide a novel construction and arrangement of parts which will permit one man to couple the plows or other implements to the tractor-frame, instead of requiring several persons as heretofore. With this general object in view, the invention resides in the novel construction and arrangement of parts hereinafter described and claimed, the descriptive matter being supplemented by the accompanying drawings.

Figure 1 is a side elevation partly in section, showing a tractor plow embodying my improvements.

Fig. 2 is a perspective view showing more particularly the means for coupling the rear ends of the implements to the tractor frame.

Fig. 3 is a perspective view of the hitch used for connecting the front ends of the implements to the frame of a tractor.

In the accompanying drawings, I have shown my improved features of construction in connection with a tractor and a gang of plows but it is obvious that such improvements are equally adaptable for connecting other implements to any portable frame.

In the drawings, I have shown a suitable tractor frame 1 provided with appropriate traction wheels 2 driven in any suitable manner. The frame 1 is equipped with a transverse shaft 3, which may be driven by any suitable means under the control of the operator, for operating mechanical plow raising means. In the present showing, such raising means includes a chain 4 to be wound on the shaft 3, this chain being connected with a lever 5 rising from a transverse rock shaft 21 which is mounted at the rear end of the frame 1. It is by turning the shaft 21, either by hand or by power, that the plows or other implements are raised and lowered in the required manner, but such raising and lowering means is claimed in my pending U. S. application, Serial No. 320370, filed August 28th, 1919. Hence the present application does not enter into detail with regard to the raising and lowering means in question.

The implement raising shaft 21 is provided with two rearwardly extending crank arms 28 and 29, the former being rigid with the shaft while the latter may be vertically adjusted by means of a suitable lever 30. Any appropriate means 31 are provided for locking the arm 29 in adjusted position and by raising or lowering this arm as required, the implements may be properly adjusted. U-clips 32 are pivotally hung on the arms 28 and 29 and the upper ends of a transverse U-bar 33 are pivoted to said clips at 34, in such manner as to allow forward and rearward swinging of said bar. This bar co-operates with a plurality of hooks 35 carried by the implements 36, in such manner as to couple the rear portions of the implements to the tractor frame and to raise and lower said implements when the shaft 21 is properly turned. The hooks 35 are shown in the form of longitudinal arms disposed above the implement beams with their rear ends directed downwardly at 37 and secured to said beams, while the front ends of the arms are entirely free. It is thus insured that when the tractor is backed with respect to the implements, the bar 33 and the hooks 35 shall come in proper engagement with each other, simply by properly steering the tractor. If the machine is shifted too far rearwardly when coupling, no injury will result since the U-bar 33 may swing forwardly against the tension of a coil spring 38, if struck by the hooks 35. In the present form of the invention I have shown one end of the spring 38 connected to one of the vertical ends of the bar 33 while the other end of said spring is attached to the rear end of an extension arm 39 which projects rearwardly from arm 28.

In order to limit the rearward swinging of the U-bar 33, I preferably pivot a rod 40 to one end of the U-bar, pass said rod slidably through a guide 41 on the extension arm 39, and equip said rod with a stop 42 adapted to strike said guide. While this construction limits the rearward swinging of the U-bar and thus at all times retains it in proper position for coupling the tractor to the implements, it allows free forward swinging of said bar whenever necessary, not only when coupling, but when the implements are being raised from the earth as seen in Fig. 2.

Coacting with the hooks 35 and the U-bar 33 in allowing the implements to be coupled to the tractor by one person, is a novel form of hitch which is shown in Figs. 1 and 3. This hitch is so designed as to allow the coacting parts thereof on the implements and the tractor frame to be connected with each other, regardless of different relative positions of the implements and tractor. This is of great advantage, since it is practically impossible to stop the tractor at exactly the correct point when backing the same for coupling the implements. This difficulty has heretofore required the services of several persons for coupling the implements and tractor together, but due to my improvements, the driver of the tractor may perform the entire coupling operation unaided.

I employ a transverse hitch bar 45 to which the front ends of the implements are adapted for connection, and in order that the clevises or the like 46 between the bar and implements may be properly connected regardless of different relative positions of the tractor frame and the implements, I mount said bar 45 in a manner to permit it to be shifted forwardly and rearwardly by hand until the aforesaid connections are complete. In the present embodiment of the invention, I have shown the ends of bar 45 mounted in longitudinal guides 47 carried by the frame 1, and each of these guides is preferably formed of an upper bar 48 and a lower bar 49, the front ends of the two upper bars being secured suitably to the frame 1 while their rear ends may well be supported by appropriate hangers 50. The bars 49 are suitably spaced below and secured to the bars 48 and the ends of the hitch bar 45 may slide forwardly or rearwardly between these bars, after the bolts or the like 51 are removed. These bolts however normally pass through the bars 48 and 49 to hold the hitch bar in its proper position for operation. Endwise sliding of bar 45 may be prevented by cotter pins 52 or other preferred means.

When coupling the plows to the tractor, the U-bar 33 is properly set for engagement with the hooks 35 and the bolts 51 are removed to allow forward shifting of the hitch bar 45. The entire tractor is then backed over the implements until the U-bar 33 comes into engagement with the hooks 35. The operator of the tractor then connects the front ends of the implements with the hitch bar 45, shifting the latter forwardly or rearwardly as required to make such connections with ease. The tractor is then shifted forwardly to bring the bar 45 to the rear ends of the guides 47, and the bolts 51 are reinserted. The entire coupling operation may be easily performed by one person and uncoupling may be accomplished with equal ease. If desired, some frangible connection may be used between the implements and the hitch bar 45 so that such connection will be broken in case the implements strike serious obstructions, and if such connection is used and broken, the U-bar 33 will shift forwardly from the hooks 35, thereby entirely freeing the implements from the tractor so that injury will not occur to any part.

From the foregoing, taken in connection with the accompanying drawings, it will be seen that I have provided a comparatively simple, yet a highly efficient and in every way desirable mechanism for permitting one person to easily couple a gang of plows or other implements to a tractor frame instead of requiring the assistance of several men as heretofore.

Since probably the best results may be obtained from the several details disclosed, such details may be followed if desired. I wish it understood however that the present disclosure is for illustrative purposes only and that within the scope of the invention as claimed, considerable latitude is allowed for making numerous changes. For instance, although the co-acting hitching means between the tractor and the plow are in the present instance formed by the bar 45 and the clevis or the like of 46, other co acting hitching means could well be used

I claim:—

1. In a machine of the class described, a portable frame, an implement, co-acting hitching means on said frame and implement capable of connection with each other when the implement and frame are in different relative positions, and co-acting coupling means on said implement and frame capable of self engagement when the latter is moved with respect to the former.

2. In a machine of the class described, a portable frame, an implement, co-acting hitching means on said frame and implement capable of connection with each other when the implement and frame are in different relative positions, co-acting coupling means on said implement and frame capable of self engagement when the latter is moved with respect to the former, and yielding mounting means for the coupling means of said frame.

3. In a machine of the class described, a portable frame, an implement, co-acting hitching means on said frame and implement capable of connection with each other when the implement and frame are in different relative positions, a U-shaped bar extending transversely of said frame and pivoted at its ends thereto, spring means permitting swinging of said U-shaped bar, and a hook on the implement to engage said bar when the frame is moved with respect to the implement.

4. In a machine of the class described, a portable frame, an implement, co-acting hitching means on said frame and implement capable of connection with each other when the implement and frame are in different relative positions, a transverse rock shaft on said frame in rear of said hitching means and having rearwardly projecting crank arms, a U-shaped bar pivoted at its ends to said crank arms for forward and rearward swinging, and a hook on said implement adapted for engagement with said U-shaped bar when the frame is moved with respect to the implement, said U-shaped bar being movable on its pivots if accidentally struck by said hook.

5. In a machine of the class described, a portable frame, an implement, co-acting hitching means on said frame and implement capable of connection with each other when the implement and frame are in different relative positions, a transverse rock shaft on said frame in rear of said hitching means having rearwardly projecting crank arms, a U-shaped bar pivoted at its ends to said crank arms for forward and rearward swinging, a hook on said implement adapted for engagement with said U-bar when the frame is moved with respect to the implement, an extension projecting rearwardly from one of said crank arms and having a guide, a rod pivoted to one of the upstanding ends of said U-shaped bar and slidable through said guide, and a coiled spring secured at one end to said upstanding bar end and secured at its outer end to said extension.

6. In a machine of the class described, a portable frame having an implement hitch and a transverse bar spaced in rear thereof, implements connected with said hitch, and horizontal longitudinal arms above said implements and all resting on the aforesaid bar, the rear ends of said arms being secured to the implements and the front ends of said arms being free.

7. A structure as specified in claim 1, the coupling means of said frame being movable under the action of the coupling means of the implement if accidentally struck by the latter.

8. A structure as specified in claim 1, the coupling means of said frame being pivotally mounted for movement under the action of the coupling means of the implement if accidentally struck by the latter.

9. In a machine of the class described, a portable frame, an implement, co-acting hitching means on said frame and implement capable of connection with each other when the implement and frame are in different relative positions, a U-shaped bar extending transversely of said frame and pivoted at its ends thereto, and a hook on the implement to engage said bar when the frame is moved with respect to the implement, said U-shaped bar being movable on its pivots if accidentally struck by said hook.

10. In a machine of the class described, a portable frame, a transverse draw bar to which an implement is adapted to be detachably hitched, means mounting said draw bar on the frame and allowing forward sliding of said bar from its operative position when hitching to the implement, and a stop to limit the rearward sliding of said bar when the frame is moved forwardly to draw the implement.

11. In a machine of the class described, a portable frame, a transverse draw bar to which an implement is adapted to be detachably hitched, and vertically spaced substantially horizontal bars extending longitudinally of said frame and receiving said draw bar therebetween, said draw bar being slidable forwardly beyond its operative position when hitching the frame and an implement together, and a stop for limiting the rearward sliding of said draw bar when said frame is moved forwardly to draw the implement.

In testimony whereof I have hereunto set my hand.

JOHN J. NATTERSTADE.